United States Patent [19]

Kawai et al.

[11] Patent Number: 4,766,466

[45] Date of Patent: Aug. 23, 1988

[54] VARIABLE MAGNIFICATION PROJECTING DEVICE

[75] Inventors: Nobuyuki Kawai, Toyohashi; Yasuo Goto, Nagoya, both of Japan

[73] Assignee: Minolta Camera Kabushiki Kaisha, Osaka, Japan

[21] Appl. No.: 37,974

[22] Filed: Apr. 14, 1987

[30] Foreign Application Priority Data

Apr. 15, 1986 [JP] Japan .................................. 61-86646

[51] Int. Cl.[4] ........................ G03B 27/34; G03B 27/40; G03B 27/70

[52] U.S. Cl. ........................................ 355/57; 355/58; 355/60

[58] Field of Search ......................... 355/55, 56, 57, 60

[56] References Cited

U.S. PATENT DOCUMENTS 3,507,576 4/1970 Linde .................................... 355/57
4,334,762 6/1982 Landa .................................... 355/57
4,422,100 12/1983 Duvall et al. ............................ 355/8
4,453,824 6/1984 Miyake et al. ........................... 355/8
4,571,064 2/1986 Hayashi et al. .......................... 355/8
4,571,065 2/1986 Yasuda ................................... 355/8

*Primary Examiner*—Monroe H. Hayes
*Attorney, Agent, or Firm*—Price, Gess & Ubell

[57] ABSTRACT

Improvements in a variable magnification projecting device for use in electrophotographic copying machines or the like to overcome the objections encountered when the magnification is varied greatly, such as a great amount of shift of the projection lens which requires a prolonged period of time, and a large amount of shift of a mirror in an undesirable direction. Variations between the same-size magnification and enlarged magnifications are effected by shifting the projection lens and at least a mirror in the rear of the lens, while variations between the same-size magnification and reduced magnifications are made by shifting the projection lens and at least mirrors in front of the lens.

9 Claims, 4 Drawing Sheets

VARIABLE MAGNIFICATION PROJECTING DEVICE

BACKGROUND OF THE INVENTION

The present invention relates to a variable magnification projecting device for use in electrophotographic copying machines or the like, and more particularly to such a projecting device which comprises, as arranged between an original plane and a projection plane, a projection lens for projecting the original image onto the projection plane and reflecting mirrors disposed in front and rear of the projection lens for folding the optical path of projection, the lens and the mirrors being movable relative to each other so as to project images at varied magnifications with the corrected conjugate length.

U.S. Pat. Nos. 4,571,064 and 3,884,574 disclose variable magnification projecting devices of the type stated above. The first of these conventional projecting devices will be described with reference to FIG. 1. For making a copy, a light source and a first movable mirror b travel leftward in the drawing at a speed of V/M (wherein V is the circumferential speed of a photosensitive drum c, and M is a magnification) to scan a document on a document table d. Simultaneously with this movement, a second movable mirror e and a third movable mirror f travel leftward in the drawing at a speed of V/2M. For varying the magnification, on the other hand, a projection lens g moves on its optical axis, and simultaneously with this movement, a fourth mirror h disposed in the rear of the projection lens g singularly moves on the optical axis for a correction of the length of the optical path.

When varying magnifications with the conjugate length corrected by the movement of the fourth mirror h, the projection lens g is positioned at Lm for a magnification of 1X (same-size magnification), at Ll for the most enlarged magnification, or at Ls for the most reduced magnification, while the fourth mirror h is positioned at Mm for the same-size magnification, at Ml for the most enlarged magnification, or at Ms for the most reduced magnification.

When the fourth mirror h only is moved with the movement of the projection lens g for correcting the conjugate length, the projection lens g and also the fourth mirror h must be moved a large distance in varying the magnification between the most enlarged magnification and the most reduced magnification.

Since the variation of the magnification thus requires a great shift of the optical system, the shift of the optical system which is designed to move at a speed not higher than a specified value to assure precision takes much time, resulting in a prolonged waiting time for the magnification varying movement. In the conventional case, the shift of the projection lens g for giving a varied magnification requires a prolonged period of waiting time.

While the fourth mirror h moves outward from the same-size magnification Mm either for a reduced magnification or for an enlarged magnification, the most reduced magnification position Ms is further outward of the most enlarged magnification position Ml. This influences the external shape or size of the machine body.

In the second conventional device, only mirrors in front of the projection lens move with the lens for a variation in the magnification, and in this respect, the second device differs from the first conventional device wherein only the mirror in the rear of the projection lens moves. However, the two devices are in common in that only the mirror at one of the front and rear sides of the projection lens moves, so that the problem of the first conventional device involved in varying the magnification is also encountered with the second device in varying the magnification.

SUMMARY OF THE INVENTION

The main object of the present invention is to provide a projecting device for projecting images at a magnification which is variable by shifting the projection lens and shifting mirrors for folding the optical path of projection, without necessitating a great shift of the projection lens or a great shift of the mirror in an undesired direction even when the magnification variable range is great.

Another object of the present invention is to provide a variable magnification projecting device wherein mirrors in front and rear of the projection lens are selectively movable in accordance with the movement of the projection lens to give a wide magnification variable range without necessitating a great shift of the projection lens or a great shift of the mirror in an undesired direction.

Another object of the present invention is to provide a variable magnification projecting device of the document-movable scanning type which is adapted to give a wide magnification variable range without necessitating a great shift of the projection lens or a great shift of the mirror in an undesired direction.

Another object of the present invention is to provide a variable magnification projecting device of the scanning type resorting to the movement of its optical system which is adapted to give a wide magnification variable range without necessitating a great shift of the projection lens or a great shift of the mirror in an undesired direction.

Still another object of the present invention is to provide a variable magnification projecting device wherein a projection lens and a mirror at the front side of the lens are moved for varying the magnification between the reduced magnification and the same-size magnification while the lens and a mirror at the rear side of the lens are moved for varying the magnification between the same-size magnification and the enlarged magnification.

Other objects and features of the present invention will become apparent from the following drawings and description.

DETAILED DESCRIPTION OF THE INVENTION

Several embodiments of the present invention will be described below with reference to the drawings.

Figure 2:
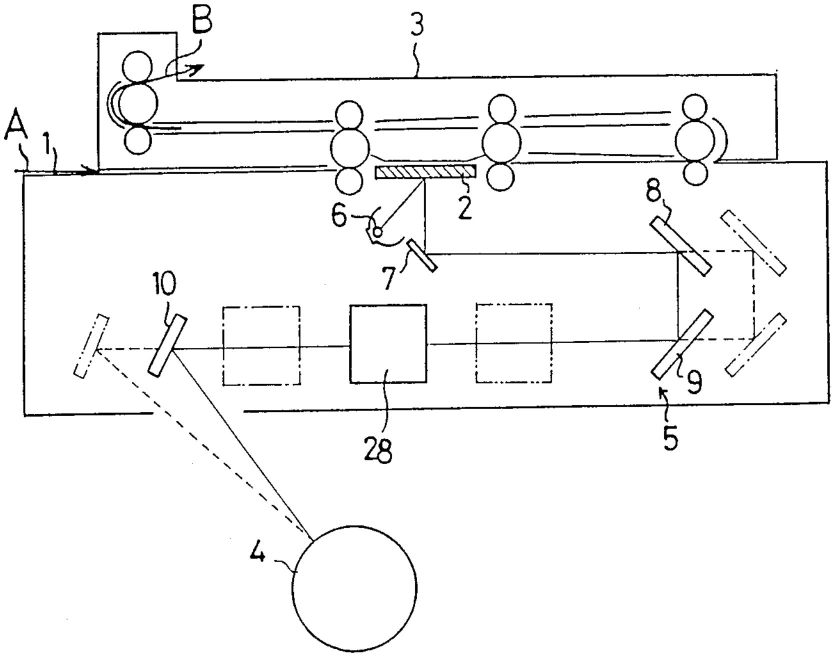
FIG. 2 is a side elevation schematically showing a first embodiment of the invention, i.e. a variable magnification projecting device of the document-movable scanning type, as incorporated in an electrophotographic copying machine.
Figure 3:
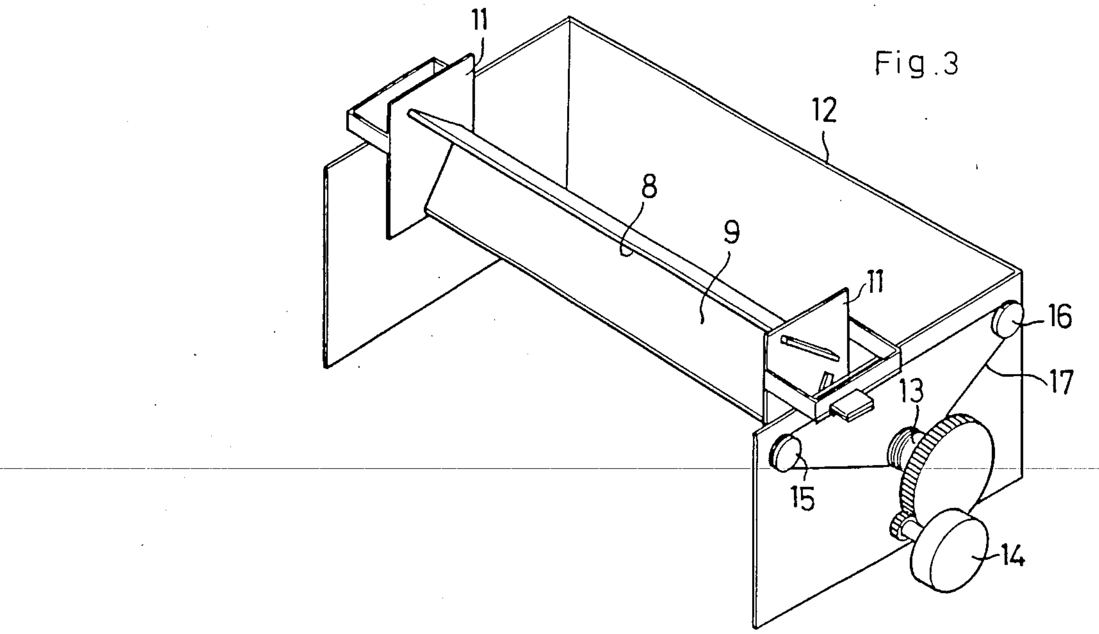
FIG. 3 is a perspective view showing a mechanism included in the embodiment for shifting mirrors in front of a projection lens for a variation in the magnifacation.
Figure 4:
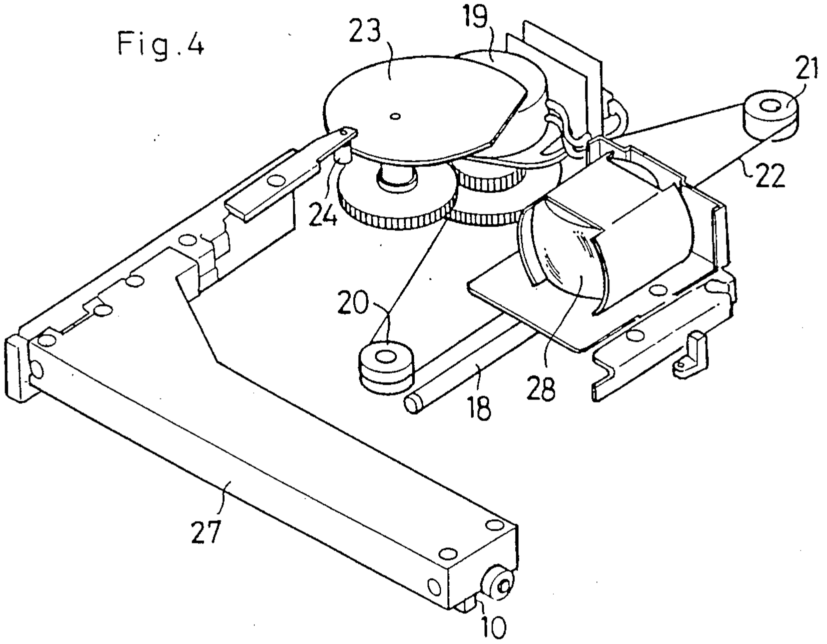
FIG. 4 is a perspective view showing a mechanism included in the embodiment for shifting the projection lens and a mirror in the rear of the lens to vary the magnification.

FIGS. 2 to 4 show a variable magnification projecting device for use in an electrophotographic copying machine wherein a document is traveled for scanning the image thereof to expose a photosensitive drum to the resulting optical image in the form of a slit. A document table 1 is provided thereon with a document handler unit 3 for traveling the document (original image bearing surface) on a document glass plate 2. The unit 3 accepts the document as indicated by an arrow A, transports the document on the glass plate 2 at a speed of V/M wherein V is the circumferential speed of the photosensitive drum (projection surface) 4, and M is a magnification, and thereafter discharges the document as indicated by an arrow B.

Disposed below the document table 1 is an optical system 5, serving as the above-mentioned variable magnification projecting device, for projecting the image of the document traveling on the glass plate 2 onto the drum 4 in the form of a slit. The optical system 5 comprises an illumination light source 6 and a first mirror 7 which are fixedly provided under the glass plate 2, and a projection lens 28 which is movable on its optical axis to give a variable magnification. The light reflected from the first mirror 7 is directed toward the projection lens 28 by second and third mirrors 8,9 arranged in front of the lens 28. These mirrors 8, 9 are movable together on the optical axis for correcting the length of the optical path upon variation of magnification. The light transmitted through the projection lens 28 is directed onto the drum 4 by a fourth mirror 10 which is disposed in the rear of the lens 28 and is movable on the optical axis for correcting the length of the optical path with the variation of magnification.

As seen in FIG. 3, the second and third mirrors 8, 9 are assembled with opposed side plates 11 and are thereby held so as to be movable along the optical axis as supported by a bracket 12. Mounted on one side of the bracket 12 is a mirror drive shaft 13 which is driven by a stepping motor 14. A mirror drive wire 17 is reeved around a pair of guide rollers 15, 16 mounted on the same side of the bracket 12 and arranged along the optical axis. A portion of the wire 17 is attached to one of the opposed side plates 11, and another wire portion is wound around the drive shaft 13. The drive shaft 13, when rotated by the motor 14, drives the wire 17 partly wound on the shaft, causing the side plates 11 to move the second and third mirrors 8, 9 along the optical axis.

With reference to FIG. 4, the projection lens 28 is guided by a guide bar 18 extending along the optical axis. The lens 28 has attached thereto a portion of a lens drive wire 22 which is reeved around guide rollers 20, 21 and which is driven by a stepping motor 19 like the wire 17. The wire 22, when driven, moves the projection lens 28 along the guide bar 18 in the direction of the optical axis.

A mirror drive cam 23 is coupled to the motor 19. A mirror holder 27 holding the fourth mirror 10 for moving the mirror 10 on the optical axis is provided with a cam follower 24 which is pressed into contact with the cam 23 by an unillustrated spring. Accordingly, as the projection lens 28 is moved on the optical axis by the motor 19, the cam 23 causes the cam follower 24 to move the fourth mirror 10 on the optical axis in a specified ratio.

The optical system in the solid-line position of FIG. 2 is in condition for a copying operation at a magnification of 1×, i.e. same-size magnification. It is now assumed that the most enlarged magnification is selected for copying. The motor 19 then operates in an enlarging direction to a predetermined step, thereby shifting the projection lens 28 forward from the solid-line position to the position of the most enlarged magnification indicated in a phantom line. With this movement, the cam 23 shifts the fourth mirror 10 from its solid-line position to its position of the most enlarged magnification indicated in a phantom line. Thus, the magnification is varied to the greatest value, with the conjugate length correspondingly corrected. Although this variation in magnification greatly changes the optical path length at the rear side of the projection lens 28 to give a corrected conjugate length, the variation is realized by moving the projection lens 28 and the fourth mirror 10 in the rear thereof a small distance away from each other relatively.

Further suppose the most reduced magnification is selected for copying. The motor 14 then operates in a reducing direction to a predetermined step, shifting the second and third mirrors 8, 9 from the solid-line position in FIG. 2 to their position of the most reduced magnification indicated in a dot-and-dash line. The other motor 19 also operates in a reducing direction to a predetermined step to shift the projection lens 28 from the solid-line position in FIG. 2 to its position of the most reduced magnification indicated in a dot-and-dash line. Although the motor 19 when operated also rotates the cam 23 at this time, the cam 23 is so shaped as to permit the fourth mirror 10 to remain in a fixed position without shifting. Whereas this variation in magnification results in a great change in the optical path length at the front side of the projection lens 28 to give a correct conjugate length, the magnification variation is realized by a small relative movement between the lens 28 and the second and third mirrors 8, 9 in front thereof in a direction away from each other.

The magnification is variable from the most enlarged to the same-size magnification by an operation reverse to the foregoing operation for the variation from the same-size to the most enlarged magnification. The variation from the most reduced to the same-size magnification can be effected by an operation reverse to the above operation for the variation from the same-size to the most reduced magnification. Further the variation between the most enlarged and the most reduced magnifications is effected by continuously varying the magnification through the same-size magnification.

As will be apparent from the above description, the variation from the same-size magnification to the most enlarged or the most reduced magnification can be realized by a diminished relative movement between the projection lens and the mirror(s) in the rear or front of the lens in a direction away from each other, with the conjugated length also thereby corrected for the variation. This greatly reduces the waiting time conventionally needed for varying the magnification as well as the maximum amount required for the movement of the mirror which was conventionally moved undesirably outwardly of the machine body. The diminution of the mirror movement amount results in lessening the influence of the mirror movement on the external shape or size of the machine.

The optical path length can be corrected more advantageously by shifting the mirrors at both front and rear sides of the projection lens with the shift of the lens.

According to the first embodiment, the projection lens 28 and the fourth mirror 10 are driven by the motor 19, and the second and third mirrors 8, 9 are driven by the other motor 14, whereas, the lens 28 can be driven with the second and third mirrors 8, 9 by a motor, with another motor used for driving the fourth mirror 10.

Furthermore, the projection lens 28 and the mirrors in front and rear of the lens can be made shiftable by a single motor, for example, by using separate cams for rendering the fourth mirror 10 and the assembly of second and third mirrors 8, 9 movable with the projection lens 28.

Figure 1:
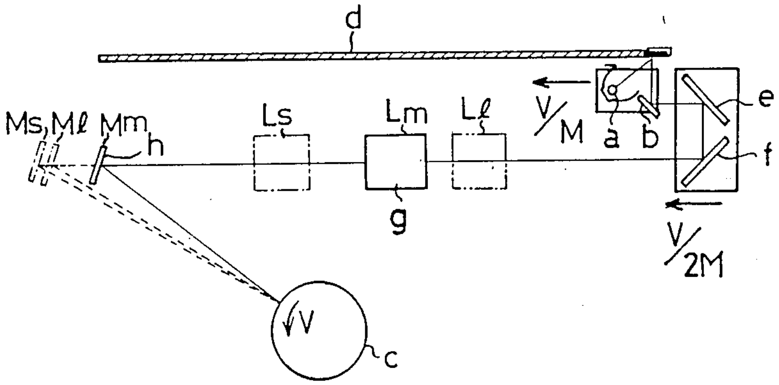
Fig. 1 PRIOR ART
FIG. 1 is a side elevation schematically showing a conventional variable magnification projecting device for use in an electrophotographic copying machine.
Figure 5:
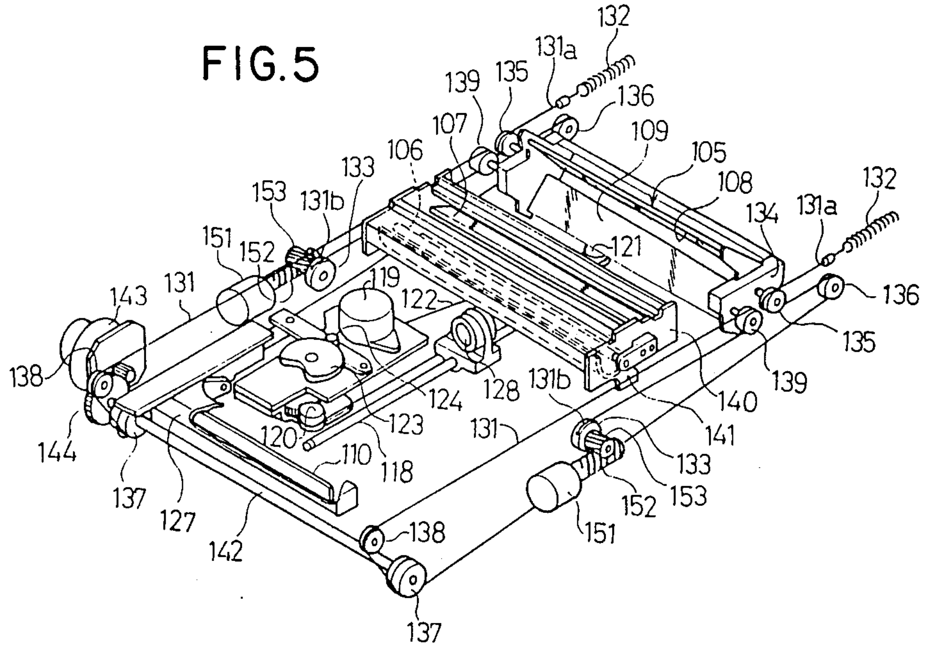
FIG. 5 is a perspective view showing a second embodiment of the invention, i.e. a variable magnification projecting device of the mirror-movable scanning type.

FIG. 5 shows a second embodiment of the invention, i.e. a variable magnification projecting device of the mirror-movable scanning type. The device has the optical system 105 of the same type as the conventional one shown in FIG. 1.

Drive mechanisms for scanning and for varying magnification will be described.

A mirror drive wire 131 for effecting a scanning movement is provided at each side of the optical system 105. The wire 131 has one end 131*a* connected to an unillustrated fixed member via a coiled spring 132 and the other end 131*b* attached to an end position adjusting roller 133. The wire 131 extending from its one end 131*a* is passed over a guide roller 135 on a movable support 134 for second and third mirrors 108, 109, over a guide roller 136 fixedly positioned at one end of the optical system, over a drive roller 137 and a guide roller 138 which are fixedly positioned at the other end of the system, and over another guide roller 139 mounted on the movable support 134, and then reaches the end position adjusting roller 133. Between the guide rollers 138, 139, the wire 131 is fastened by a pin 141 to a portion of a movable support 140 for a light source 106 and a first mirror 107.

The opposite drive rollers 137 each having the wire 131 passed therearound have a common drive shaft 142, which is driven at a reduced speed by a motor 143 through a train of gears 144.

The drive roller 137, when thus driven, drives the wire 131 in the direction of rotation of the roller 137. It is noted that the wire 131 has its other end 131*b* attached to a fixed point on the roller 133 and is tensioned by the coiled spring 132 acting on one end 131*a* thereof, so that the opposite ends of the wire 131 are in fixed positions. However, from where the wire 131 is in contact with the drive roller 137, the wire 131 extends toward its one end 131*a* as one side portion and toward the other end 131*b* thereof as the other side portion, and these opposite side wire portions are reeved around and folded over the guide rollers 135, 139 in directions opposite to each other. Accordingly, one-side wire portion forwarded from the drive roller 137 is loosened, whereas the other-side wire portion drawn onto the drive roller 137 is tensioned, with the result that the two guide rollers 135, 139 are moved together toward the tensioned side of the wire 131, i.e. in the direction in which the wire 131 is driven, with its opposite ends held in the fixed positions.

The movable support 134 carrying the second and third mirrors 108, 109 thereon is therefore moved in the direction of travel of the wire 131, following the movement of the guide rollers 135, 139. The speed of movement of the support 134 is one-half the speed of travel of the wire 131.

On the other hand, the other movable support 140 carrying the light source 106 and the first mirror 107 thereon is moved in the same direction and at the same speed as the wire 131.

As a result, the light source 106 and the first mirror 107 are moved at a speed of V to scan the image of a document in a specified position, while the second and third mirrors 108, 109 are moved in the same direction at a speed of V/2, thus maintaining a constant length of optical path of projection during the scanning movement.

The end position adjusting roller 133 to which the wire 131 is attached is coupled to another motor 151 via a worm 152 and a worm wheel 153 and can therefore be driven at a reduced speed by the motor 151 through the irreversible transmission means. By driving the roller 133 in this way, the rotated position of the roller 133 is finely adjustable, while the roller 133 can be fixedly held in its adjusted position against the tension exerted on the wire 131 by the coiled spring 132. The adjusted rotated position determines the position of the other end 131*b*. In accordance with the position of the other end 131*b*, the wire end 131*a* is displaced with a stretch or contraction of the coiled spring 132, whereby the wire 131 is shifted in its entirety, consequently causing the supports 134, 140 to alter the distance therebetween independently of the scanning movement. This movement is effected with the movement of a projection lens 128 for varying the magnification between the same-size and the most reduced magnifications, with the optical path length also corrected as required. The range of movement of the first mirror 107 may be set outside the range of scanning movement for the document, with the optical system adapted to initiate a slit exposure operation upon reaching the actual scanning movement range. It is then possible to eliminate the influence due to the movement of the first mirror 107 merely by adjusting the exposure initiating timing.

The coiled spring 132 is stretched or contracted by adjusting the position of the other end 131*b* of the wire 131, whereas if the spring 132 is given a smaller spring constant so as not to alter greatly its spring force when stretched or contracted, the wire 131 can be made free of great variations in the tension acting thereon.

As in the case of the first embodiment, the projection lens 128 is made movable with a fourth mirror 110 by a single motor 119. FIG. 5 further shows a guide bar 118 for the lens 128, a drive wire 122 for the lens 128, guide rollers 120, 121 for the drive wire 122, a cam 123 and a cam follower 124 for transmitting torque from the motor 119 to the fourth mirror 110, and a mirror cover 127.

Figure 6:
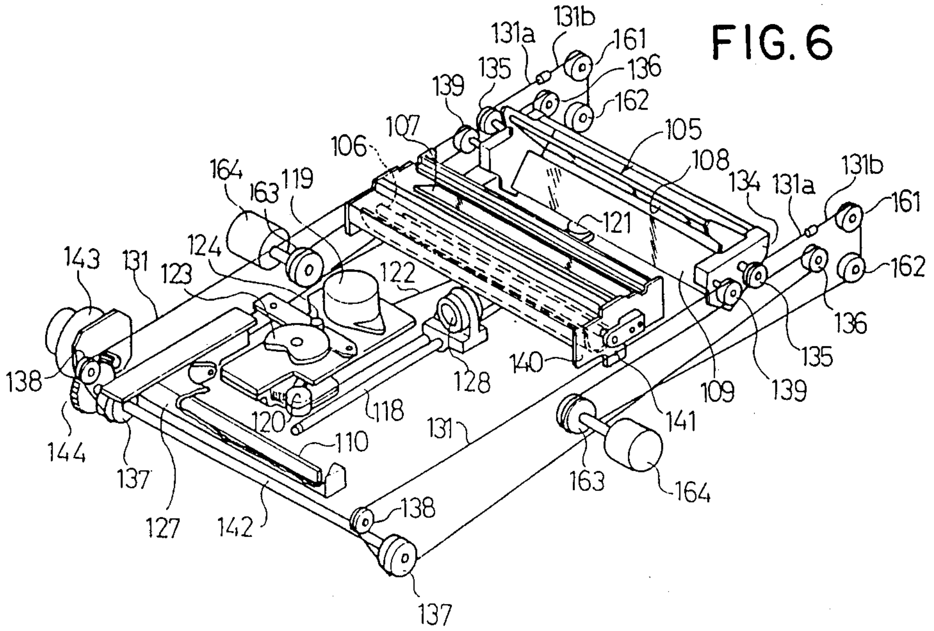
FIG. 6 is a perspective view showing a third embodiment of the same scanning type as the second embodiment but having a different mechanism for shifting the mirrors in front of the projection lens to vary the magnification.

FIG. 6 shows a modification of the embodiment of FIG. 5. Throughout FIGS. 5 and 6, like parts are referred to by like reference numerals and will not described again. Each wire 131 provided as shown in FIG. 5 for scanning is joined end-to-end as at 131*a*, 131*b* and is thereby made endless. The wire 131 is passed around detour guide rollers 161, 162 and wound around a wire position adjusting roller 163 connected to a motor 164. When the wire 131 is moved by driving the roller 163, the first mirror 107 and the assembly of second and third mirrors 108, 109 are moved independently of the scanning movement, whereby the optical path length can be corrected. Since the ends 131*a* and 131*b* are moved in the same direction by the same amount at this time, no variation occurs in the tension on the wire, although the wire 131 can be suitably tensioned when the ends 131*a* and 131*b* are connected together by a coiled spring. For scanning, the roller 163 must hold the wire 131 in position. This can be realized by providing a brake on the motor 164 or using an irreversible transmission system.

With the embodiment of FIG. 5 and the modification of FIG. 6, a single motor is usable for driving the roller 133 or 163 along with the projection lens and the fourth mirror 110 via specific cams.

Figure 7:
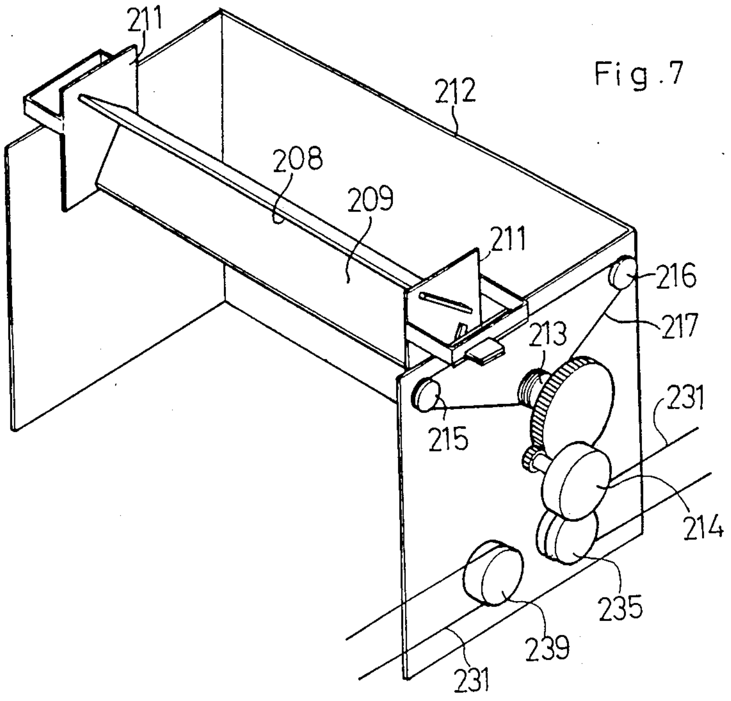
FIG. 7 is a fragmentary perspective view showing a fourth embodiment of the invention, i.e. a variable magnification projecting device of the movable mirror scanning type, wherein the mirrors in front of the projection lens are shiftable by a different mechanism.

FIG. 7 shows a fourth embodiment of the invention which is similar to the second or third embodiment. The embodiment includes a movable support 212 which is movable for correcting the optical path length before a scanning movement. A mirror holder 211 holding mirrors 208, 209 movable for the correction is supported on the support 212 movably in the direction of the optical axis. The mirror holder 211 is connected to a wire 217 which is reeved around guide rollers 215, 216 and a drive roller 213 on one side of the movable support 212. When the drive roller 213 is driven by a motor 214 connected thereto, the wire 217 shifts the mirror holder 211 along the optical axis in accordance with the direction of rotation of the roller 213 to correct the optical path length at the front side of the projection lens with a variation in magnification. The drawing further shows a scanning drive wire 231 and guide rollers 235, 239 for the wire 231.

What is claimed is:

1. A variable magnification projecting device of slit scanning type having a projection lens for projecting an original image on a plane of projection and reflecting mirrors arranged in front and rear of the projection lens for folding the optical path of projection, the lens and the mirrors being movable relative to each other to give a corrected conjugate length and a variable magnification, the projecting device comprising:

lens shifting means for moving the projection lens substantially along its optical axis, means for holding the mirrors movably along the optical axis of projection, and mirror shifting means for moving the mirrors with the movement of the projection lens, the mirror shifting means being operable to move at least the mirror in the rear of the projection lens when the projection lens is moved between a same-size magnification position and an enlarged magnification position and to move at least the mirrors in front of the projection lens when the projection lens is moved between the same-size magnification position and a reduced magnification position.

2. A variable magnification projecting device as defined in claim 1 further including means for moving an original image to permit a scanning of the image.

3. A variable magnification projecting device as defined in claim 2 further including a single motor, wherein the mirror shifting means and the lens shifting means are connected to the single motor and are movable in a cooperative relationship with each other.

4. A variable magnification projecting device as defined in claim 1 which further comprises scanning operation means for effecting mirrors in front of the projection lens to provide a movable optical system for scanning a document, whereby an image of the document is projected in the form of a slit on the projection surface.

5. A variable magnification projecting device as defined in claim 4 wherein the front side mirrors include a first mirror and a second mirror and the scanning operation means comprises a single wire for driving the first mirror and the second mirror in a speed ratio of 2:1 in the same direction, the wire having its opposite ends held in position and being passed over a drive roller for the scanning operation and over two guide rollers arranged along the optical axis and mounted on a movable support for the second mirror, the wire being reeved around and thereby folded over the two guide rollers in opposite directions, and the mirror shifting means for the mirror in front of the projection lens includes the scanning operation wire, the wire having one end connected to a fixed member via a resilient member and the other end directly attached to the outer periphery of an end position adjusting roller, the end position adjusting roller being coupled to a drive source independent of the drive roller for the scanning operation, thereby the second mirror is moved for correction of the optical path length.

6. A variable magnification projecting device as defined in claim 5 wherein the mirror shifting means for moving the mirror or mirrors in front or rear of the projection lens to give a varied magnification and the lens shifting means are coupled to a single motor and are thereby movable in operative relation with each other.

7. A variable magnification projecting device as defined in claim 4 wherein the front side mirrors include a first mirror and a second mirror and the scanning operation means comprises a single wire for driving the first mirror and the second mirror in a speed ratio of 2:1 in the same direction, the wire being substantially endless and having a portion thereof retained in position, the wire being passed over a drive roller for the scanning operation and over two guide rollers arranged along the optical axis and mounted on a movable support for the second mirror, the wire being reeved around and thereby folded over the two guide rollers in opposite directions, and the mirror shifting means for the mirror in front of the projection lens includes the scanning operation wire, the wire having its retained portion reeved around a wire position adjusting roller so as to be driven by the rotation thereof, the wire position adjusting roller being coupled to a drive source independent of the drive roller for the scanning operation, thereby the second mirror is moved for correction of the optical path length.

8. A variable magnification projecting device as defined in claim 7 wherein the mirror shifting means for moving the mirror or mirrors in front or rear of the projection lens to give a varied magnification and the lens shifting means are coupled to a single motor and are thereby movable in operative relation with each other.

9. A variable magnification projecting device as defined in claim 4 wherein the front side mirrors include a first mirror and the second mirror and the scanning operation means drives the first mirror and the second mirror in a speed ratio of 2:1 in the same direction, and the second mirror is supported on a support movable for the scanning operation and are moved thereon along the optical axis by the mirror shifting means for the mirrors in front of the projection lens.

* * * * *